(12) United States Patent
Dickerson et al.

(10) Patent No.: US 6,296,549 B1
(45) Date of Patent: Oct. 2, 2001

(54) APPARATUS AND METHOD OF MACHINING BRAKE COMPONENTS

(75) Inventors: Weston E. Dickerson, Milford, MI (US); Petar Jakovljevic, Mississauga (CA)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/524,684

(22) Filed: Mar. 13, 2000

Related U.S. Application Data (62) Division of application No. 09/193,063, filed on Nov. 16, 1998, which is a continuation of application No. 09/064,484, filed on Apr. 22, 1998, now abandoned.

(51) Int. Cl.$^7$ .................................................. B24B 1/00
(52) U.S. Cl. ........................ 451/28; 451/51; 451/177; 451/218; 451/254; 451/902; 451/908
(58) Field of Search ............................... 451/28, 51, 177, 451/218, 254, 902, 908

(56) References Cited

U.S. PATENT DOCUMENTS

| | | |
|---|---|---|
| 2,719,902 | 10/1955 | Flynn . |
| 2,739,935 | 5/1956 | Kehl et al. . |
| 2,783,411 | 2/1957 | Matulaitis . |
| 3,433,727 | 3/1969 | Keeleric . |
| 3,504,154 | 3/1970 | Marcolini . |
| 3,509,305 | 4/1970 | Bertolasi . |
| 3,655,937 | 4/1972 | Ullmann et al. . |
| 3,800,117 | 3/1974 | Anderson . |
| 3,878,353 | 4/1975 | Anderson . |
| 3,943,321 | 3/1976 | Pfau et al. . |
| 4,107,504 | 8/1978 | Dinsdale . |
| 4,146,770 | 3/1979 | Dinsdale et al. . |
| 4,205,212 | 5/1980 | Ullmann et al. . |
| 4,221,952 | 9/1980 | Sato et al. . |
| 4,229,635 | 10/1980 | Dinsdale . |
| 4,233,485 | 11/1980 | Sato et al. . |
| 4,242,557 | 12/1980 | Sato et al. . |
| 4,251,706 | 2/1981 | Frei et al. . |
| 4,287,403 | 9/1981 | Sato et al. . |
| 4,346,278 | 8/1982 | Bhattacharyya . |
| 4,367,391 | 1/1983 | Furukawa . |
| 4,441,004 | 4/1984 | Inoue . |

(List continued on next page.)

FOREIGN PATENT DOCUMENTS 10349717   12/1960  (CH) .

OTHER PUBLICATIONS

Fawzy El–Menshawy, Advances in Electro–Discharge Texturing (EDT) for Cold Mill Work Rolls, Iron and Steel Engineer, Aug. 1991, pp. 57–59.

Jorge M. Simao, Electrical Discharge Texturing of Cold Mill Work Rolls Using Different Tool Electrode Materials, Iron and Steel Engineer, Mar. 1996, pp. 42–47.

*Primary Examiner*—Derris H. Banks
*Assistant Examiner*—Shantese McDonald
(74) *Attorney, Agent, or Firm*—Marshall & Melhorn, LLC (57) ABSTRACT

This invention relates to an improved apparatus and method for finish machining brake components. The apparatus includes an electrode ring adapted to be secured to a rotatable shaft. The electrode ring includes at least one plurality of circumferentially spaced apart electrodes adapted to be electrically connected to a power supply. Each one of the at least one plurality of electrodes are arranged adjacent each other around the circumference of the electrode ring. The apparatus further includes a positioning mechanism for positioning a rotating, electrically grounded rotor adjacent the electrode ring until sparks are formed between the electrode ring and the rotor. The sparks vaporize a portion of the rotor surface thereby creating a finished surface on the rotor having the desired dimensions.

31 Claims, 9 Drawing Sheets

U.S. PATENT DOCUMENTS

| | | |
|---|---|---|
| 4,471,199 | 9/1984 | Michishita et al. . |
| 4,527,036 | 7/1985 | Furukawa . |
| 4,628,171 | 12/1986 | Colloy et al. . |
| 4,683,364 | 7/1987 | Anderson . |
| 4,697,059 | 9/1987 | Furukawa . |
| 4,819,325 | 4/1989 | Cross et al. . |
| 4,922,076 | 5/1990 | Cross et al. . |
| 4,950,860 | 8/1990 | El-Mensawy . |
| 4,992,639 | 2/1991 | Watkins et al. . |
| 5,089,681 | 2/1992 | El-Menshawy . |
| 5,108,561 | 4/1992 | Kuromatsu . |
| 5,354,961 | 10/1994 | Diot et al. . |
| 5,360,957 | 11/1994 | Haefner et al. . |
| 5,396,040 | 3/1995 | Girardin . |
| 5,407,035 * | 4/1995 | Cole et al. .......................... 188/218 |
| 5,451,737 | 9/1995 | Bertholds et al. . |
| 5,453,593 | 9/1995 | Seok-Yong et al. . |
| 5,543,599 | 8/1996 | Cole et al. . |
| 5,750,951 | 5/1998 | Kaneko et al. . |
| 5,922,222 | 7/1999 | Jens et al. . |

* cited by examiner

APPARATUS AND METHOD OF MACHINING BRAKE COMPONENTS

This application is a Division of Ser. No. 09/193,063, filed Nov. 16, 1998, and which is a Cont. of Ser. No. 09/064,484, filed Apr. 22, 1998, now abandoned.

RELATED APPLICATION

This application is claiming the benefit, under 35 U.S.C. § 120, of the utility application, Ser. No. of 09/193,063, filed Nov. 16, 1998, which was filed claiming the benefit, under 35 U.S.C. § 120, of the utility application Ser. No. 09/064, 484, filed Apr. 22, 1998. The utility applications Ser. Nos. 09/064,484 and 09/193,063 are hereby incorporated by reference.

BACKGROUND OF THE INVENTION

The present invention relates to rotors for caliper disc brakes and the like, and in particular to an electric discharge machine for producing brake components and a method for making same.

Rotors are generally well known in the art, and are used extensively in vehicle braking systems, power transmission devices, clutches, and other similar machinery and mechanisms. Vehicle caliper disc braking systems slow the vehicle by inhibiting the rotation of the vehicle wheels. Rotors used in typical vehicle braking systems include a central hat section for attaching the rotor to a vehicle wheel and drive member for rotation therewith, and an outer friction section having opposite friction surfaces.

A caliper assembly is secured to a non-rotating component of the vehicle, such as the vehicle frame. The caliper assembly includes a pair of brake pads disposed adjacent the rotor friction surfaces, and a moveable piston operatively connected to one or more of the brake pads. When the driver brakes the vehicle, hydraulic or pneumatic forces move the piston which clamps the pads against the friction surfaces of the rotating rotor. As the brake pads press against the moving rotor friction surfaces, frictional forces are created which oppose the rotation of the wheels and slow the vehicle. The friction converts the vehicle's kinetic energy into large quantities of heat, much of which is absorbed by the friction surfaces and conducted to the rest of the rotor and to other components to which the rotor is connected.

Brake rotors are typically cast from a ferrous material, such as cast or grey iron, and are then machined in multiple operations to shape the rotor, to form the inner hub portion and friction surfaces. However, ferrous material rotors are relatively heavy and they corrode during normal use. Brake rotors are also cast from aluminum based metal matrix composite (MMC) containing silicon carbide particulate reinforcement. Aluminum MMC rotors have sufficient mechanical and thermal properties at a significantly reduced weight compared to ferrous metal rotors. Typically, the rotor is cast from aluminum MMC and then machined in a conventional manner to form the finished rotor.

During conventional machining, a tool is pressed against the part to remove a portion of the surface of the part. However, conventional machining offers a disadvantage in that the physical contact between the tool and the part partially deforms the part during machining producing imprecision in the finished parts. For example, it is desirable to produce rotors having flat friction sections. Variations in the surface of the friction section produces undesirable brake noise, pedal pulsations, and non-uniform wear.

Additionally, the particulate reinforcement in aluminum MMC parts is very hard which makes the aluminum MMC castings difficult to machine. Special cutting tools made from expensive materials such as polycrystalline diamond are needed to machine aluminum MMC, yet the tools still tend to wear quickly which increases production costs. It is desirable to produce brake components, such as metal rotors, made from materials such as cast iron or aluminum MMC using an apparatus and technique which will reduce production costs while improving the tolerances of the parts.

Electric discharge machining (EDM) is a known method of machining metal parts using electric sparks. The electric sparks are directed against the surface to be machined. A high temperature is reached where the spark contacts the metal surface. The high temperature vaporizes the metal at that location. A series of sparks are directed at the surface to burn away a portion of the metal resulting in a finish machined part.

EDM offers advantages over conventional machining in that the EDM apparatus does not physically contact the part thereby improving the tolerances of the finished part. However, known EDM apparatus and machining techniques are slow, typically producing only about 5,000 sparks per second. The number of sparks produced per unit time in part determines how quickly the part can be machined. Conventional EDM apparatus are too slow to be cost effective for use in mass production. It is desirable to provide an apparatus and a method for machining metal brake components such as cast iron or aluminum MMC rotors using electrically discharged sparks which is quick and cost effective.

SUMMARY OF THE INVENTION

This invention relates to an improved apparatus and method for finish machining brake components. The apparatus includes an electrode ring adapted to be secured to a rotatable shaft. The electrode ring includes a plurality of circumferentially spaced apart first electrodes adapted to be electrically connected to a first power supply, and a plurality of circumferentially spaced apart second electrodes adapted to be electrically connected to a second power supply. The first and second electrodes are arranged adjacent each other in an alternating fashion around the circumference of the electrode ring. The apparatus further includes a positioning mechanism for positioning a rotating, electrically grounded brake rotor or other brake component adjacent the electrode ring until sparks are formed between the electrode ring and the rotor. The sparks vaporize a portion of the rotor surface thereby creating a finished surface on the rotor having the desired dimensions.

In an alternative embodiment, the apparatus includes only one plurality of circumferentially spaced apart electrodes adapted to be electrically connected to a power supply. In this embodiment, the apparatus includes just one power supply. The power supply is connected to the plurality of circumferentially spaced apart electrodes. In all other respects, the apparatus is the same as earlier described.

The invention also includes a method of finish machining a brake rotor with the EDG apparatus. First, the brake rotor is cast to produce a brake rotor casting having a radially inner hub portion with generally axially extending hat wall, a radially outer annular friction section having a radially inner edge, and an annular groove disposed adjacent the hat wall at the radially inner edge of the friction section. The rotor casting is then mounted on the component mount thereby electrically connecting it to ground and rotated. The electrode ring is also rotated while submerged in the dielectric oil.

The first electrodes are electrically connected to a first power supply and the second electrodes are electrically connected to a second power supply. The rotating rotor is then at least partially submerged in the dielectric oil and moved close to the electrode ring such that sparks form between the discharge surfaces of said first and second electrodes and said rotor which vaporize a portion of the surface of said rotor. The rotor and electrode ring are rotated while the sparks are generated between them until a sufficient amount of material is removed to achieve a rotor with a finished friction section having the desired dimensions. The opposite friction surface may be finish machined in a variety of different ways, including using a second electrode ring adjacent that side and simultaneously finishing both sides, moving the electrode ring to the opposite side and finishing it in a similar manner as the first side described above, or by turning the rotor over on the component mount and repeating the previously described steps.

The previously cited alternate embodiment operates similarly to the embodiment cited above. The main difference is that the alternate embodiment does not require that the second electrodes are electrically connected to the second power supply. This for the reason, that these two elements are not required to practice the alternate embodiment. Therefore the steps to manipulate these elements are not required.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
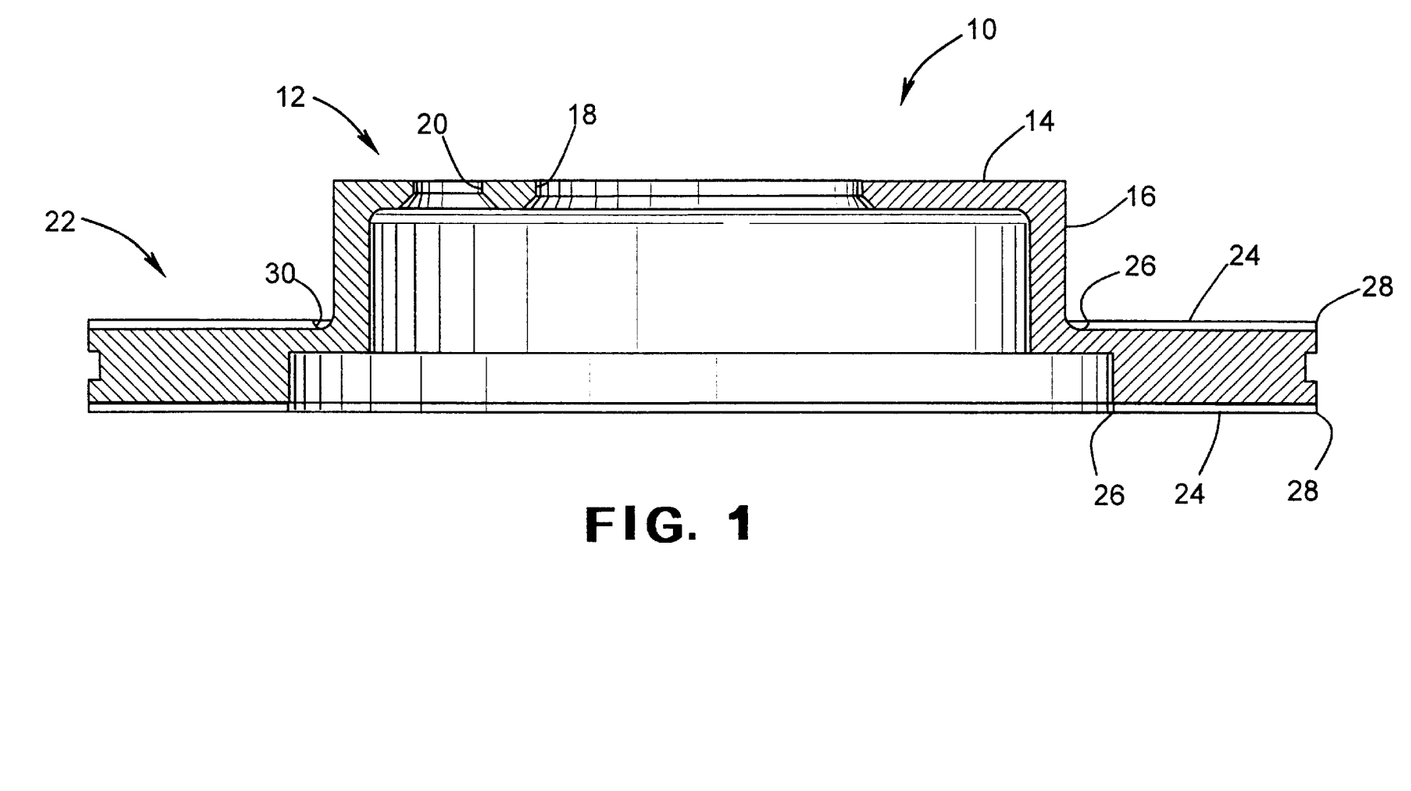
FIG. 1 is an elevational section view of a rotor casting to be machined in accordance with the present.
Figure 2:
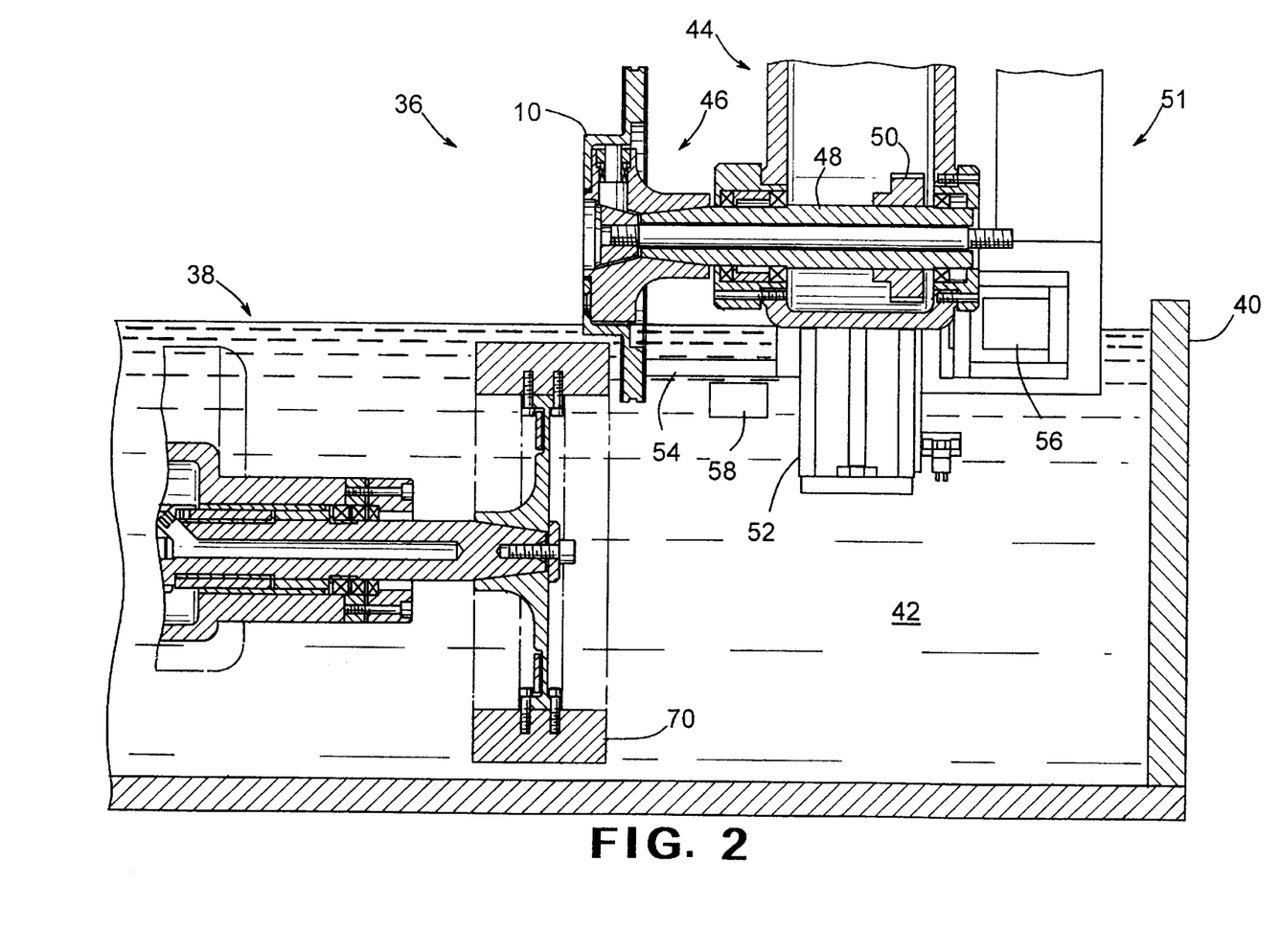
FIG. 2 is an elevational view of a portion of an electrical discharge machining apparatus in accordance with the present invention.

For purposes of description herein, the terms "upper," "lower," "right," "left," "rear," "front," "vertical," "horizontal," and derivatives thereof shall relate to the invention oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a rotor casting 10 is illustrated. The rotor casting 10 is preferably formed by casting aluminum MMC in a conventional manner to produce the casting having physical dimensions which are close to the desired final dimensions. However, the rotor casting may be formed from other suitable materials such as iron. The rotor casting 10 is then finished machined using an Electric Discharge Machining (EDM) apparatus, also referred to as an Electric Discharge Grinding (EDG) apparatus described below in a machining method described below to achieve the finished part having the desired dimensions.

The rotor casting 10 includes a radially inner hub portion 12 having a central, generally circular mounting section 14 which mounts the same on an associated drive member (not shown), such as a spindle or vehicle axle. A hat wall 16 extends generally axially from the periphery of the mounting section 14. The hat wall 16 is preferably straight and cylindrical extending at a right angle from the mounting section 14, however, the hat wall may be inclined, forming a portion of a cone. The central mounting section 14 has a central pilot aperture 18 cast therein, in which the drive member is closely received. Fastener apertures 20 may be cast into the central mounting section 14 for receiving fasteners to secure the rotor to the drive member. Alternatively, the fastener apertures 20 may be machined into the rotor casting 10 using conventional machining techniques.

The rotor 10 also includes a radially outer annular friction section 22 having opposite friction surfaces 24 which interface with associated friction members (not shown), such as brake pads or the like. The annular friction section 22 of the rotor 10 has a radially inner edge 26 and a radially outer edge 28. An annular groove 30 is disposed adjacent the hat wall 16 at the radially inner edge 26 of the friction section 22. Optional vents (not shown) may extend radially or axially through the friction section 22 for cooling.

Referring now to FIG. 2, a portion of an EDG apparatus is illustrated generally at 36. The EDG apparatus 36 includes an electrode assembly 38 submerged in a tank 40 containing a dielectric oil 42 which is known in the art. The EDG apparatus 36 further includes a positioning mechanism 44 for positioning the rotor 10 a predetermined distance from the electrode assembly 38 and providing a path to ground for the spark (not shown).

The positioning mechanism 44 includes a component mount 46 having shaft 48 for receiving the rotor 10. The component mount 46 is electrically connected to ground, the same ground to which the power supplies are also connected. When the rotor 10 is mounted to the component mount 46 it is also connected to ground. A motor (not shown) is drivingly coupled to a pulley 50 mounted to the shaft 48 for rotating the shaft and the rotor 10. The positioning mechanism 44 also includes a dual axis positioning guide 51 having a vertical guide 52 and horizontal guide 54. A positioning driver 56 moves the component mount 46 along the vertical and horizontal guides 52, 54 into the desired position adjacent the electrode assembly 38. A spark sensor 58 senses for sparks between the electrode assembly 38 and the rotor 10, and communicates with the positioning driver. When the spark sensor 58 indicates to the positioning driver 56 that sufficient sparks exist, the rotor has obtained the proper position relative to the electrode assembly for machining and the positioning driver 56 stops the movement of the rotor. Throughout the machining process, the spark sensor 58 continually communicates with the positioning driver 56. The positioning driver 56 uses the spark sensor information for making adjustments in the position of the rotor 10 to achieve the most sparks possible thus maximizing the machining efficiency of the EDG apparatus.

Figure 3:
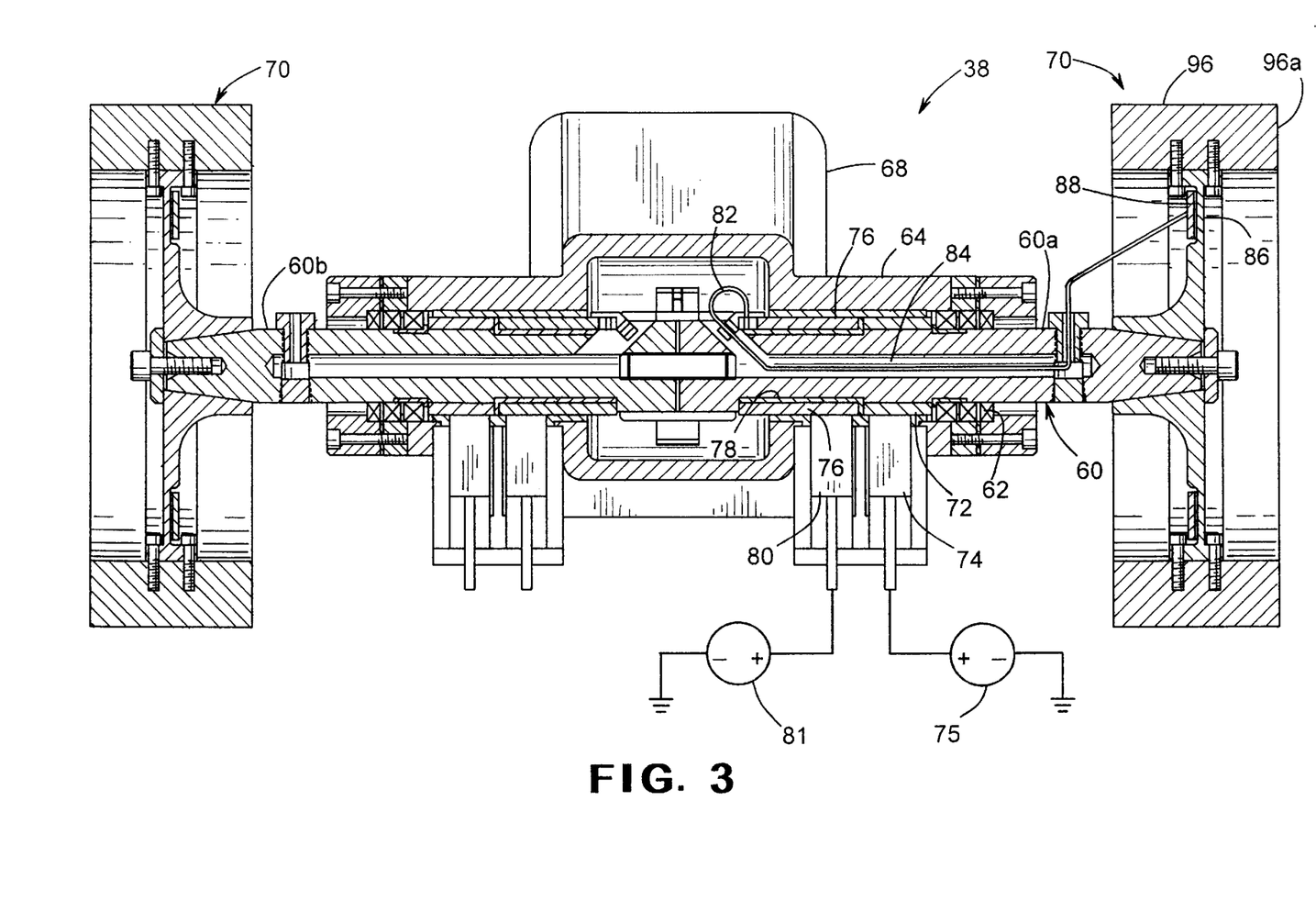
FIG. 3 is a elevational sectional view of a portion of the electrical discharge machining apparatus in accordance with the present invention.

Referring now to FIG. 3, the electrode assembly 38 is illustrated in detail. The electrode assembly 38 includes a shaft 60 mounted for rotation in bearings 62 which are supported by the body 64 of the electrode assembly. The shaft 60 is preferably constructed of steel or some other electrically conductive material. An electric motor 68 is drivingly coupled to the shaft 60 for rotating the shaft and the rotor 10. The shaft 60 preferably includes two similar halves 60a and 60b. Each halve of the shaft is similar in construction and function, and to avoid duplication, only one of the shaft halves 60a shall be described in detail. A pair of electrode disk assemblies 70, which shall be described in detail below, are mounted to the opposite ends of each half of the shaft 60a and 60b.

An electrically conductive first ring 72 is mounted to the shaft 60a for rotation therewith. The first ring 72 encircles the shaft and is electrically connected thereto. The first ring 72 is preferably constructed of copper, but may be made of any suitable electrically conductive material. A first brush 74 abuts the first ring 72. The first brush 74 is electrically conductive and known in the art. The first brush 74 is connected to a voltage terminal of a first power supply 75.

A second ring 76 encircles the shaft 60a, but is electrically insulated from the shaft by an annular insulator 78 disposed between the shaft and the second ring. The second ring 76 is preferably constructed of copper, but may be made of any suitable electrically conductive material. A second brush 80 abuts the second ring 76. The second brush 80 is electrically conductive and known in the art. The second brush 80 is connected to a voltage terminal of a second power supply 81. A wire 82 is electrically connected to the second ring 76. The wire 82 extends through a bore 84 formed through the middle of the shaft 60a extending from the second ring 76 to the opposite end of the shaft. The wire 82 exits the bore 84 and is electrically connected to a portion of the electrode assembly 70 as described in detail below.

Figure 4:
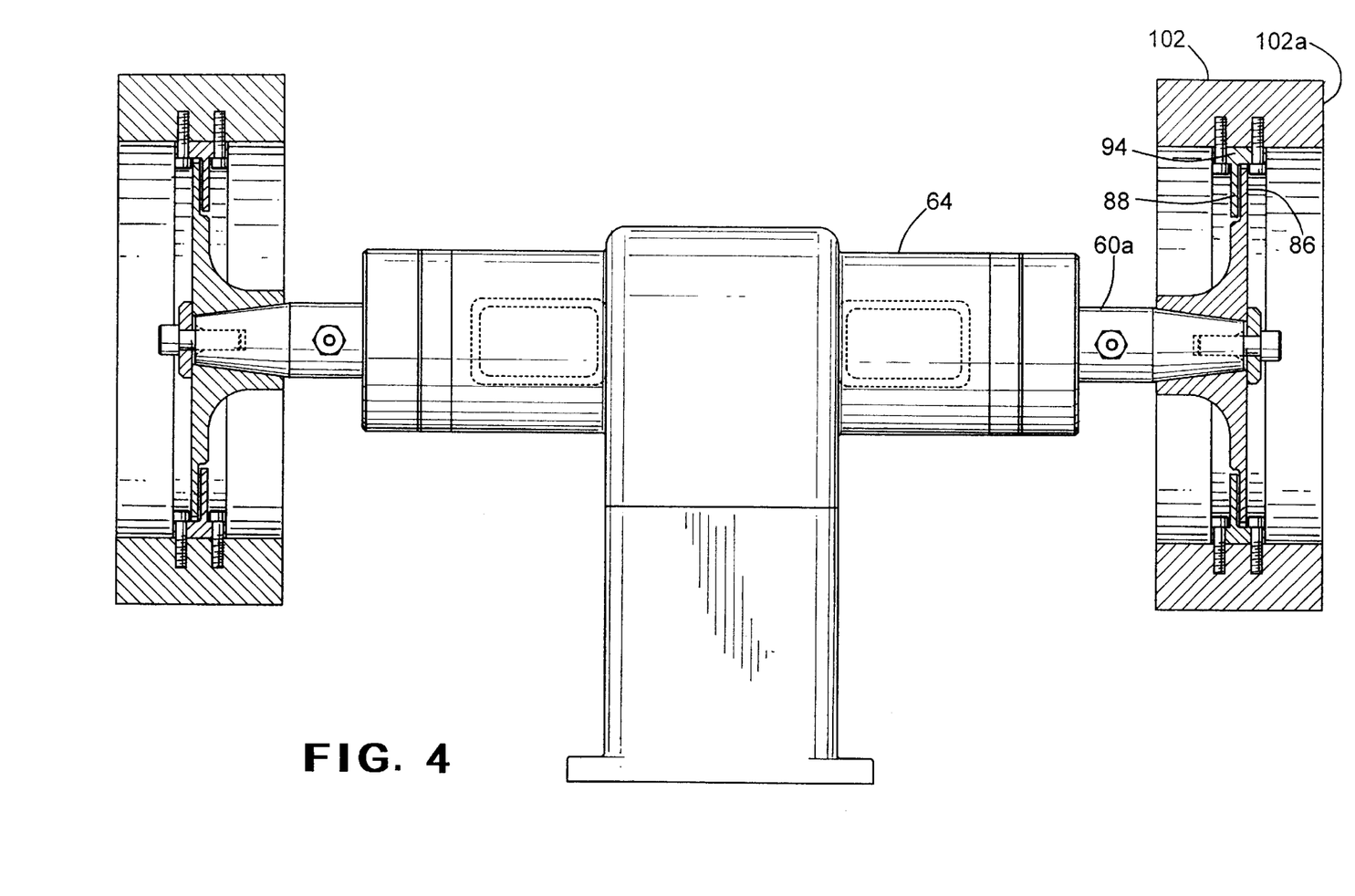
FIG. 4 is an elevational view of a portion of the electrical discharge machining apparatus in accordance with the present invention.
Figure 5:
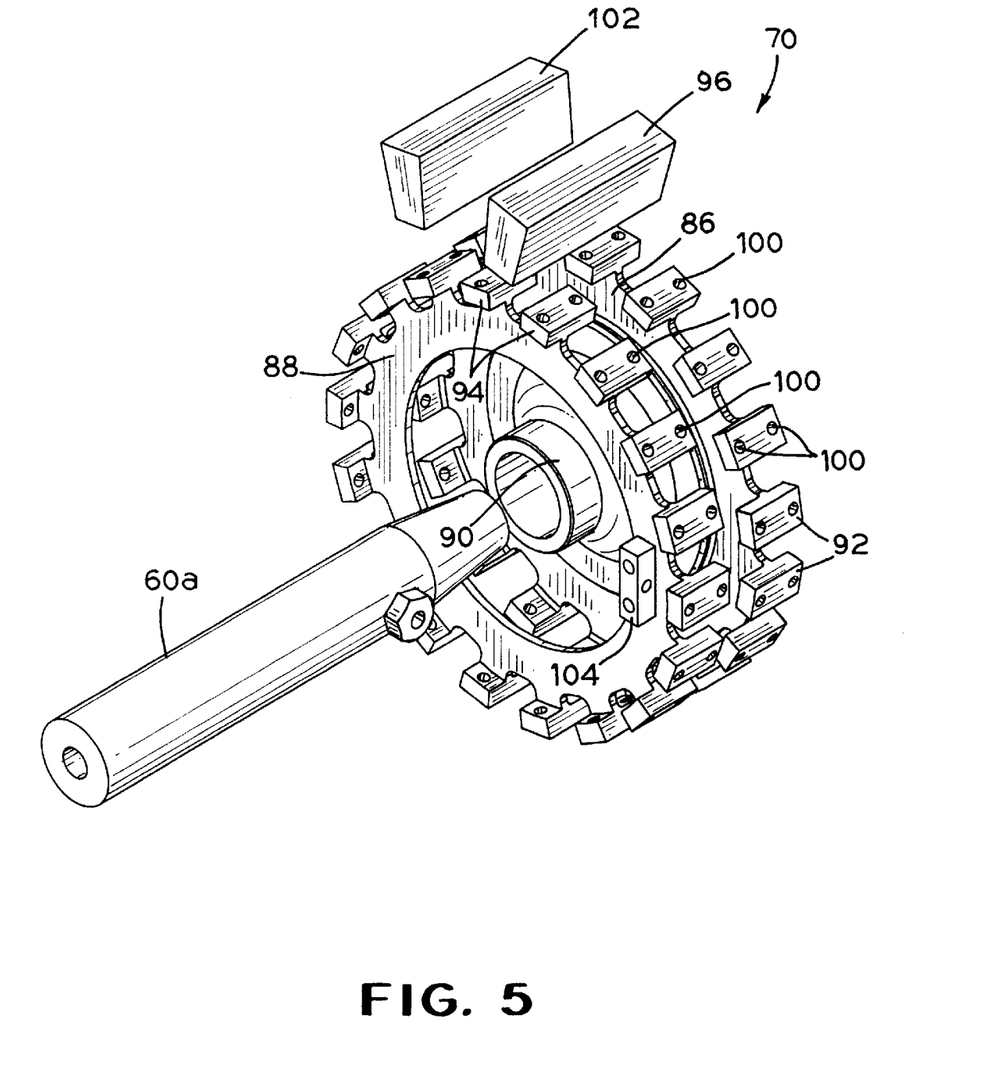
FIG. 5 is a perspective view of a portion of the electrode disks for use in the electrical discharge machining apparatus in accordance with the present invention.
Figure 6:
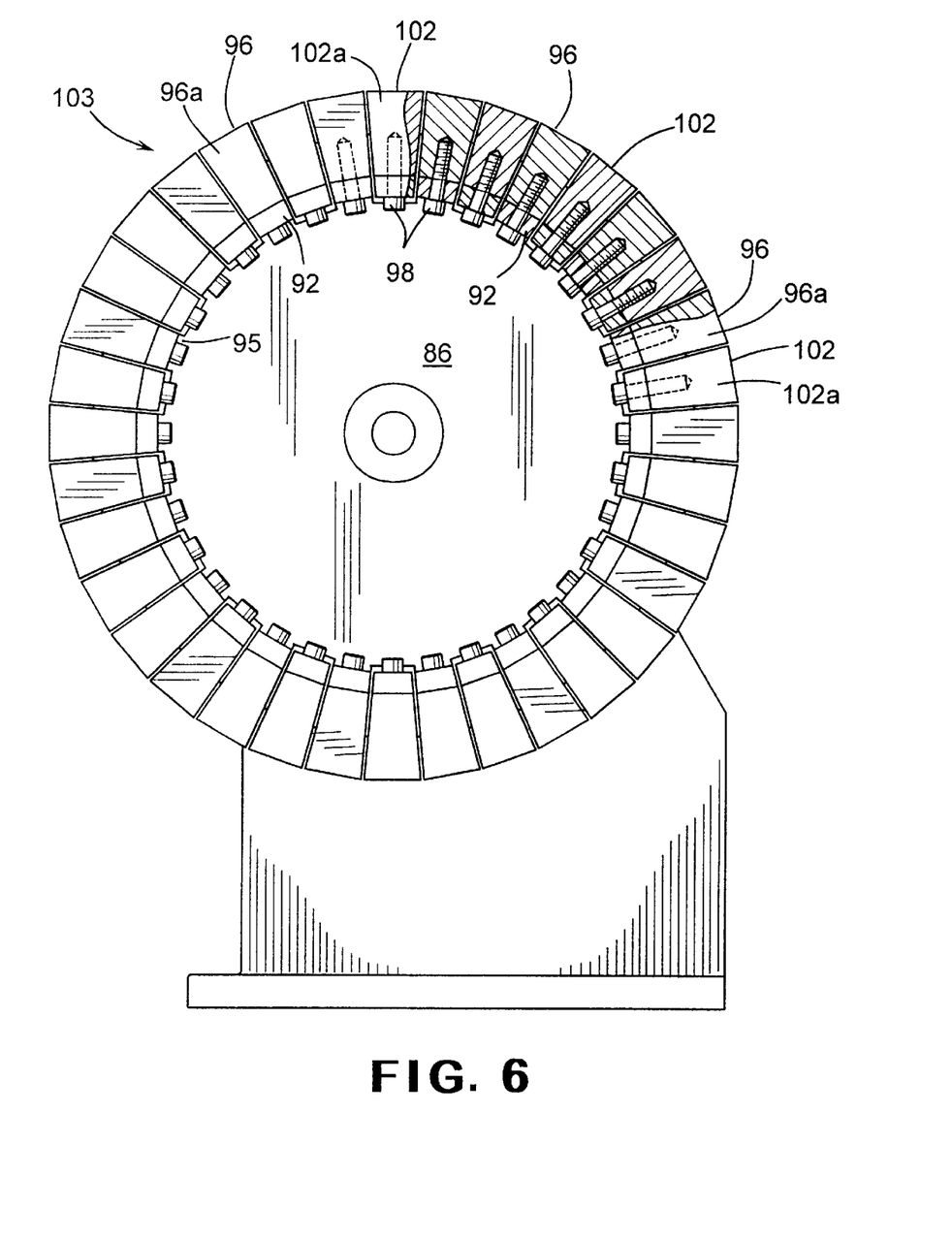
FIG. 6 is an elevational view of the electrode ring for use in the electrical discharge machining apparatus in accordance with the present invention.

Referring now to FIGS. 4, 5 and 6, the electrode disk assembly 70 is illustrated in detail. The electrode disk assembly 70 includes a first electrode disk 86 and a second electrode disk 88. The first electrode disk 86 includes a central mounting hub 90 for mounting the disk to the shaft 60a. The first electrode disk 86 further includes a plurality of circumferentially spaced apart electrode pads 92 extending from the radially outer periphery of the disk. The electrode pads 92 are regularly spaced around the entire circumference of the first electrode disk 86. The electrode pads 92 are preferably rectangular, extending along the axis of the first disk 86.

The second electrode disk 88 also includes a plurality of circumferentially spaced apart electrode pads 94 extending from the radially outer periphery of the second disk. The second electrode pads 94 are regularly spaced around the entire circumference of the second electrode disk 88. The first and second electrode disks 86 and 88, and the first and second electrode pads 92, and 94 are preferably constructed from steel, although any suitable electrically conductive material may be used. The electrode pads 92, 94 may be formed integrally with the respective electrode disk 86, 88, or they may be secured thereto.

As shown in FIG. 5, the first and second electrode disks 86 and 88 are mechanically secured together in a coaxial relationship such that the first and second electrode pads 92 and 94 are disposed adjacent each other in an alternating configuration forming an electrode pad ring 95. The disks 86 and 88 are electrically insulated from each other by insulators (not shown) disposed between the disks. The first electrode pads 92 are circumferentially spaced apart from the adjacent second electrode pads 94. The shaft 60a is received in the central mounting hub 90 of the first disk 86 to secure the first and second disks 86, 88 to the shaft for rotation therewith.

Individual first electrodes 96 are mounted to each first electrode pad 92 by screws 98 extending through apertures 100 in the pads 92. Approximately 18 first electrodes are mounted to the first electrode disk 86, although any suitable number may be used. Individual second electrodes 102 are mounted to each second electrode pad 94 by similar screws 98 extending through apertures 100 in the pads 94. Approximately 18 second electrodes are mounted to the second electrode disk 86, although any suitable number may be used. The first and second electrodes 96 and 102 are preferably constructed from graphite, although any known suitable electrode material may be used. The first and second electrodes 96 and 102 have respective flat discharge surfaces 96a and 102a. The electrodes 96 and 102 are disposed along the ring of electrode pads 95 to form an electrode ring 103 consisting of alternating first and second electrodes 96 and 102.

A first electrical connection is formed from the voltage terminal of the first power supply 75, through the first brush 74, through the first ring 72, through the shaft 60a, through the first electrode disk 86, through the first electrode pads 92 to the first electrodes 96. The wire 82 is electrically connected to the second electrode disk 88 via a terminal 104 disposed on the disk. A second electrical connection is formed from the voltage terminal of the second power supply 81, through the second brush 80, through the second ring 76, through the wire 82, through the second electrode disk 88, through the second electrode pads 94 to the second electrodes 102.

Figure 7:
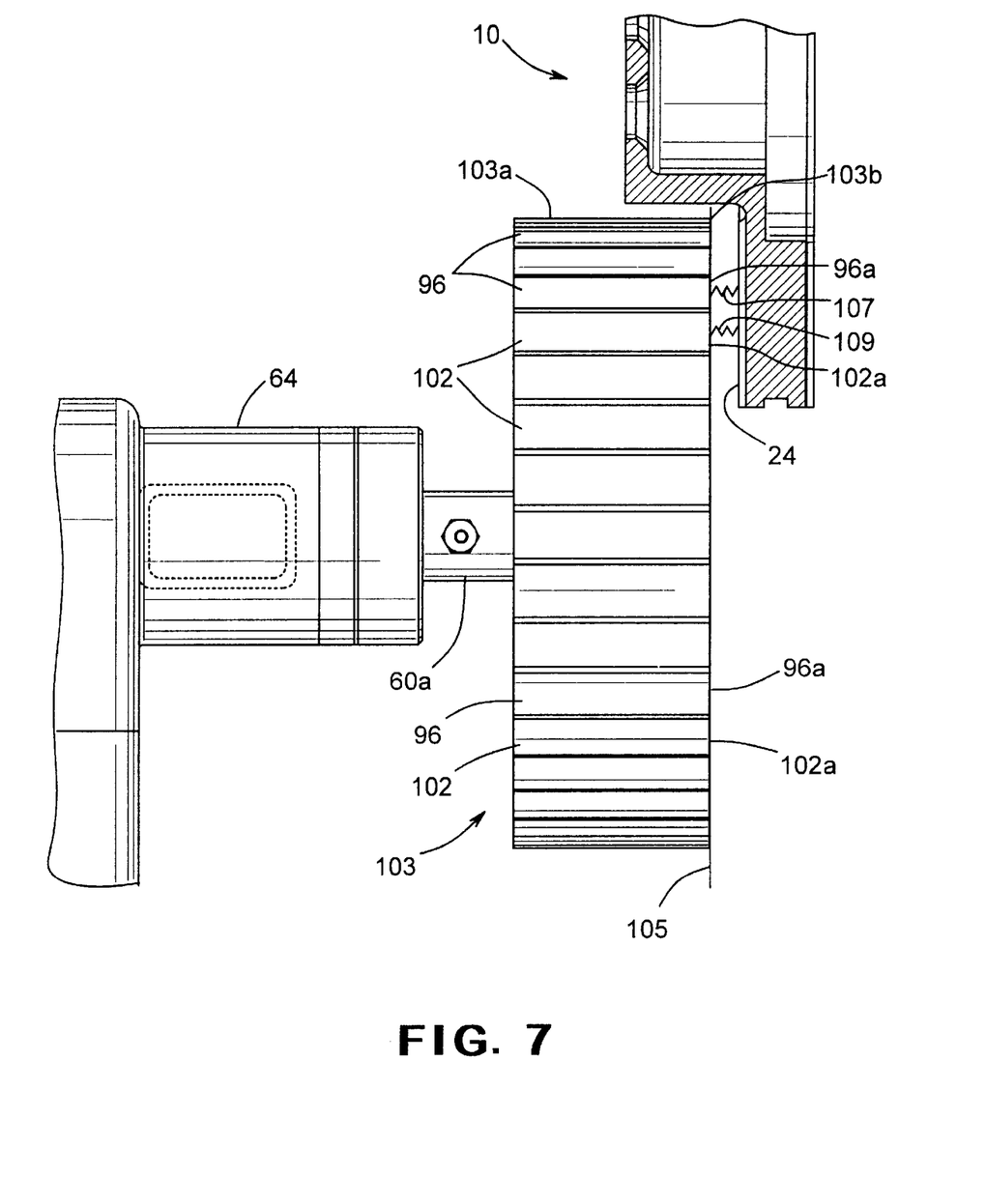
FIG. 7 is a side elevational view of the electrode ring for use in the electrical discharge machining apparatus in accordance with the present invention.

Referring now to FIG. 7, the first and second electrodes 96 and 102 are arranged in the electrode ring 103 such that the discharge surfaces 96a and 102a define a plane 105. The electrode ring 103 has a radially outer cylindrical surface 103a and a radially outer edge 103b formed by the intersection of the cylindrical surface 103a with the discharge surfaces 96a, 102a of the first and second electrodes 96, 102. As described above, the electrode assembly 38 includes a second half 60b of the shaft 60, which includes a second electrode disk assembly similar to the one described above, having a second electrode ring similar to the one described above. Also, the EDG apparatus includes a second positioning mechanism similar to the one described above. The EDG apparatus can therefore, finish machine two rotors or other brake components simultaneously.

Referring now to FIGS. 2 and 7, the operation of the EDG apparatus 10 shall now be described. The electrode assembly 38 is submerged in the dielectric oil 42 as described above. The voltage terminals of the first and second power supplies 75, and 81 are connected to the first and second brushes 74 and 80 respectively. The shaft 60a and electrode disk assembly 70 are then rotated by the motor 68. The rotor 10 is mounted on the component mount shaft 48 of the positioning mechanism 44, and rotated by the motor (not shown). The positioning driver 56 moves the rotor 10 along the vertical and horizontal guides until a portion of the rotor including part of the friction surfaces is partially submerged. The positioning driver 56 continues to move the rotor 10 until it is adjacent the electrode disk assembly 70 so that only a small gap exists between the first and second electrode discharge surfaces 96a, 102a and the rotor friction surface 24. When the gap shrinks to a predetermined distance, preferably $1/1000$ to $3/1000$ of an inch, the dielectric 42 no longer provides sufficient resistance, and a first spark 107 is created between one of the first electrode discharge surfaces 96a and the nearest point on the rotor friction surface 24. A second spark 109 is created between one of the second electrode discharge surfaces 102a and the nearest point on the rotor friction surface 24.

As the electrode disk assembly 70 rotates, the next pair of first and second electrode discharge surfaces 96a, 102a pass near the rotor friction surface 24 creating two more sparks. Each spark creates a very high temperature of approximately 10,000 to 12,000 degrees Celsius at the friction surface 24 of the rotor 10. The high temperatures vaporize a portion of the metal of the friction surface 24. By turning both the rotor 10 and the electrode disk assembly 70, the sparks strike different portions of the friction surface until the entire surface is finished to the desired dimensions. The opposite friction surface may be finish machined in a variety of different ways, including using a second electrode ring adjacent that side and simultaneously finishing both sides, moving the electrode ring to the opposite side and finishing it in a similar manner as the first side described above, or by turning the rotor 10 over on the component mount 46 and repeating the previously described steps. Although the EDG apparatus is described finish machining the friction surfaces of a rotor, other surfaces of the rotor may finish machined in a similar manner. Also, other brake components may be finish machined in a similar manner by the EDG apparatus.

By using two groups of electrodes 96 and 102, connected to two different power supplies 75 and 81, the EDG apparatus produces two sparks at a time between the electrode ring 103 and the rotor 10, resulting in twice as many sparks per unit of time as known EDM apparatus using only one group of electrodes. The EDG apparatus can thus finish machine a part more quickly than previously known EDM apparatus. Alternatively, the EDG apparatus may use 3 or more groups of electrodes connected to 3 or more respective power supplies to achieve even more sparks per unit time.

Figure 8:
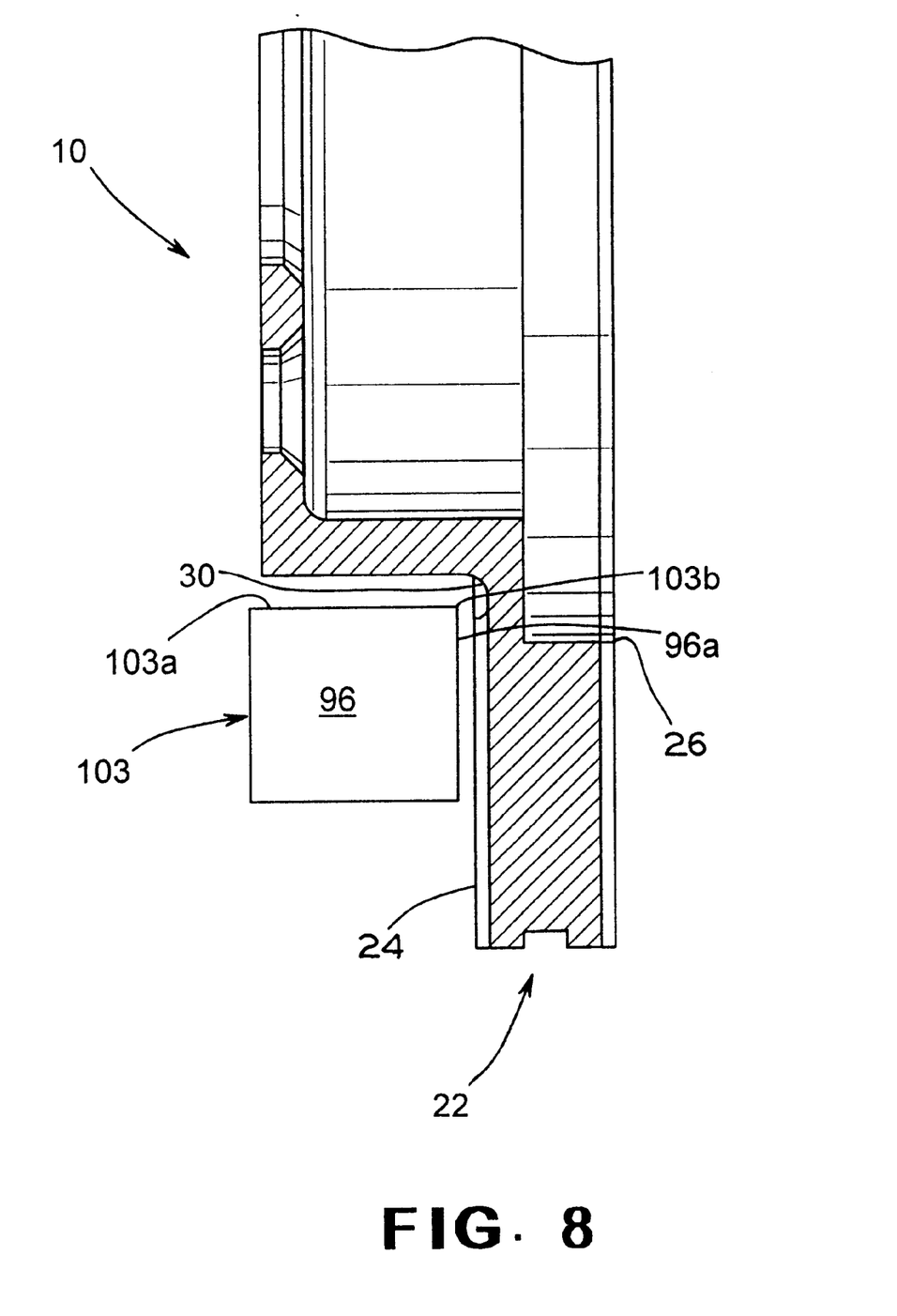
FIG. 8 is a elevational sectional view of a portion of the electrode ring disposed adjacent the rotor during operation of electrical discharge machining apparatus in accordance with the present invention.

Referring now to FIG. 8, the friction section 24 of the rotor 10 is illustrated adjacent a portion of the electrode ring 103 comprising electrode 96 as described above. During operation of the machining apparatus, the rotor 10 is preferably aligned with respect to the electrode ring 103 such that the radially outer edge 103b of the ring 103 is positioned adjacent the groove 30 thereby increasing the distance between the electrodes 96, 102 and the rotor 10 at the outer edge 103b. The increased distance prevents arcing between the radially outer edge 103a and the rotor friction surface 24 which causes premature wear at the edges of the electrodes 96, 102. When the opposite friction surface 24 is machined, the radially outer edge 103b of the ring 103 is positioned radially inwardly from the radially inner edge 26 of the friction section 26 for similar reasons.

The method of finish machining a brake rotor with the EDG apparatus shall now be described. First, the brake rotor is cast to produce a brake rotor casting having a radially inner hub portion with generally axially extending hat wall, a radially outer annular friction section having a radially inner edge, and an annular groove disposed adjacent the hat wall at the radially inner edge of the friction section. The rotor casting is then mounted on the component mount 46 thereby electrically connecting it to ground and rotated. The electrode ring 103 is also rotated while submerged in the dielectric oil 42.

The first electrodes are electrically connected to a first power supply and the second electrodes are electrically connected to a second power supply. The rotating rotor is then at least partially submerged in the dielectric oil and moved close to the electrode ring such that sparks form between the discharge surfaces of said first and second electrodes and said rotor which vaporize a portion of the surface of said rotor. The rotor 10 and electrode ring 103 are continued being rotated while separated by the predetermined distance until a sufficient amount of material is removed to achieve a rotor with a finished friction section having the desired dimensions. The opposite friction surface may be finish machined in a variety of different ways, including using a second electrode ring adjacent that side and simultaneously finishing both sides, moving the electrode ring to the opposite side and finishing it in a similar manner as the first side described above, or by turning the rotor 10 over on the component mount 46 and repeating the previously described steps. Although the method described is for finish machining the friction surfaces of a rotor, other surfaces of the rotor may finish machined in a similar manner. Also, other brake components may be finish machined in a similar manner.

The method described above may also include aligning the rotor with respect to the electrode ring 103 such that the radially outer edge 103b of the ring 103 is positioned adjacent the groove 30 thereby increasing the distance between the electrodes 96, 102 and the rotor 10 at the outer edge 103b. The increased distance prevents arcing between the radially outer edge 103a and the rotor friction surface 24 which causes premature wear at the edges of the electrodes 96, 102. When the opposite friction surface 24 is machined, the radially outer edge 103b of the ring 103 is positioned radially inwardly from the radially inner edge 26 of the friction section 26 for similar reasons.

Figure 9:
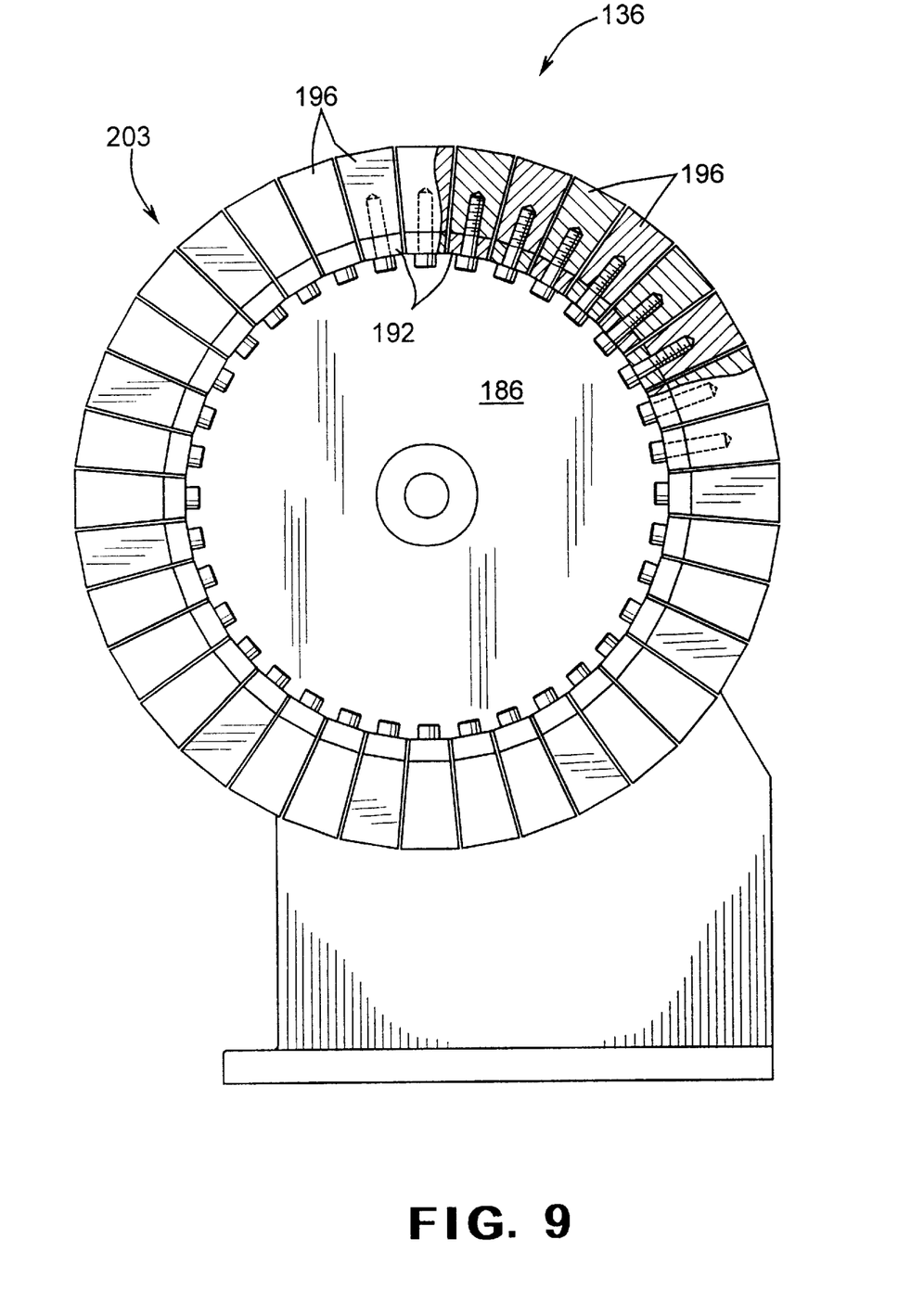
FIG. 9 is an elevational view of an alternate embodiment of the electrode ring for use in the electrical discharge machining apparatus in accordance with the present invention.

An alternative embodiment of the EDG apparatus 36 is shown in FIG. 9, illustrated generally at 136. The EDG apparatus 136 finishes a rotor in a similar manner as the EDG apparatus 36 described above. The EDG apparatus 136 includes mostly the same elements as previously described regarding the EDG apparatus 36. The main difference is that the electrode disk assembly 70 includes only one electrode disk 186 (as shown in FIG. 9). The alternate embodiment electrode disk 186 is attached to the apparatus 38 in the same manner as the first electrode disk 86. The alternate embodiment electrode disk 186 also includes a plurality of circumferentially spaced apart electrode pads 192, regularly spaced around the entire circumference of the electrode disk 186. The electrode pads 192 are similar to the electrode pads 92. This embodiment does not include a second electrode disk.

In the alternate embodiment, the apparatus includes a plurality of individual electrodes 196. Each electrode 196 is attached to an electrode pad 192 in the same manner as the each first electrode 96 is attached to each first electrode pad 92. Each individual electrode 196 is constructed from the same material as each individual electrode 96. The alternate embodiment does not include a plurality of individual second electrodes.

The EDG apparatus 136 also includes an electrode ring 203. The electrode ring 203 is similar to the electrode ring 103, except the electrode ring 203 consists of electrodes 196 that are all connected to the same power supply. In comparison, the electrode ring 103 consisted of first and second electrodes 96, 102 which were connected to the first and second power supplies 75, 81 respectively. Due to the fact that all of the electrodes 196 that make up electrode ring 203 are electrically connected to the same power supply, the EDG apparatus 136 will produce only one spark at a time to machine rotor 10. In all other respects, electrode ring 203 is analogous to electrode ring 103.

In the alternate embodiment, the invention is practiced with only the first power supply as the sole power supply. The alternate embodiment does not include a second power supply and its associated components. This power supply, in the alternate embodiment, is electrically attached to each electrode 196 in the same manner as each electrode 96 is attached to the first power supply 75. The power supply of the alternate embodiment operates in the same manner as the first power supply 75.

The EDG apparatus 136, of the alternate embodiment, operates in a alike manner as the EDG apparatus 36, previously discussed. The changes in the operation of the alternate embodiment mostly result from the lack of the second power supply 81. Like before, the electrode assembly 38 is submerged in the dielectric oil 42 as previously stated. The operation of the EDG apparatus 136 proceeds in a similar manner except that there is no connection of the voltage terminals of the second power supply 81 to the brush 80.

Just as stated before, when the gap between the electrode discharge surface, for electrode 196, shrinks to a predetermined distance, preferably $\frac{1}{1000}$ to $\frac{3}{1000}$ of an inch, the dielectric 42 no longer provides sufficient resistance and a spark is created. The spark is similar to spark 107 previously cited. As stated before, the alternate embodiment does not include a second spark 109. In the alternate embodiment, the spark only occurs between the electrode 196 and the point on the friction surface 24 of the rotor 10 nearest the electrode 196. Thus, this embodiment uses only one spark at a time to finish the rotor.

The method associated with this alternate embodiment is analogous to the method of the apparatus as previously described. The significant differences are the lack of the steps regarding the second power supply 81 and the finishing of the rotor 10 with the second spark 109. In all other respects, the method of the invention is the same.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of machining a brake rotor comprising:
   providing a brake rotor having an axis of rotation and an annular friction section having a friction surface coaxially disposed about the axis of rotation;
   providing an electrode assembly including a plurality of electrodes and each electrode having an associated discharge surface, wherein the electrodes are disposed such that the discharge surfaces are aligned in a plane;
   rotating the rotor in a first direction about the rotor axis; and
   machining the friction surface by moving the electrode discharge surfaces within the plane simultaneously moving one of the electrodes near the surface of the brake rotor friction section to create a spark therebetween while moving another one of the electrodes away from surface of the brake rotor friction section to prevent a spark therebetween.

2. The method of machining a brake rotor defined in claim 1 wherein the electrode assembly is an electrode ring and the electrodes are circumferentially spaced apart around the ring such that each electrode discharge surface forms a separate sector of the electrode ring.

3. The method of machining a brake rotor defined in claim 2 further including rotating the electrode assembly so that the electrode discharge surfaces move within the plane.

4. The method of machining a brake rotor defined in claim 3 further including rotating the electrode assembly in a second direction, opposite the first direction.

5. The method of machining a brake rotor defined in claim 1 wherein the machining step includes machining the friction surface by moving the electrode discharge surfaces within the plane simultaneously moving a first plurality the electrodes near the surface of the brake rotor friction section to create sparks therebetween while moving a second plurality of electrodes near the surface of the brake rotor friction section to prevent a spark therebetween, wherein the first and second pluralities of electrodes each include a first electrode connected to a first power supply and a second electrode connected to a second power supply.

6. The method of machining a brake rotor defined in claim 5 wherein the electrode assembly is an electrode ring and the electrodes are circumferentially spaced apart around the ring such that each electrode discharge surface forms a separate sector of the electrode ring.

7. The method of machining a brake rotor defined in claim 5 further including rotating the electrode assembly so that the electrode discharge surfaces move within the plane.

8. The method of machining a brake rotor defined in claim 7 further including rotating the electrode assembly in a second direction, opposite the first direction.

9. The method of machining a brake rotor defined in claim 1 wherein the machining step includes machining the friction surface by moving the electrode discharge surfaces within the plane simultaneously moving a first plurality the electrodes near the surface of the brake rotor friction section to create sparks therebetween while moving a second plurality of electrodes away from the surface of the brake rotor friction section to prevent sparks therebetween, wherein the first and second pluralities of electrodes each include a plurality of electrode groups such that the electrode groups are electrically insulated from each other and the electrodes within each group are electrically connected to each other.

10. The method of machining a brake rotor defined in claim 9 wherein the electrode assembly is an electrode ring and the electrodes are circumferentially spaced apart around the ring such that each electrode discharge surface forms a separate sector of the electrode ring.

11. The method of machining a brake rotor defined in claim 10 further including rotating the electrode assembly so that the electrode discharge surfaces move within the plane.

12. The method of machining a brake rotor defined in claim 11 further including rotating the electrode assembly in a second direction, opposite the first direction.

13. A method of machining a part having an annular surface comprising:
   providing a part having an annular surface coaxially disposed about an axis of rotation;
   providing an electrode assembly including a plurality of electrodes and each electrode having an associated discharge surface, wherein the electrodes are disposed such that the discharge surfaces are aligned in a plane;

rotating the part in a first direction about the axis of rotation; and machining the annular surface of the part by moving the electrode discharge surfaces within the plane simultaneously moving one of the electrodes near the annular surface of the part to create a spark therebetween while moving another one of the electrodes away from annular surface of the part to prevent a spark therebetween.

14. The method of machining a part defined in claim 13 wherein the electrode assembly is an electrode ring and the electrodes are circumferentially spaced apart around the ring such that each electrode discharge surface forms a separate sector of the electrode ring.

15. The method of machining a part defined in claim 14 further including rotating the electrode assembly so that the electrode discharge surfaces move within the plane.

16. The method of machining a part defined in claim 15 further including rotating the electrode assembly in a second direction, opposite the first direction.

17. The method of machining a part defined in claim 13 wherein the machining step includes machining the annular surface of the part by moving the electrode discharge surfaces within the plane simultaneously moving a first plurality the electrodes near the annular surface of the part to create sparks therebetween while moving a second plurality of electrodes near the annular surface of the part to prevent a spark therebetween, wherein both the first and second pluralities of electrodes include a first electrode connected to a first power supply and a second electrode connected to a second power supply.

18. The method of machining a part defined in claim 17 wherein the electrode assembly is an electrode ring and the electrodes are circumferentially spaced apart around the ring such that each electrode discharge surface forms a separate sector of the electrode ring.

19. The method of machining a part defined in claim 18 further including rotating the electrode assembly in a second direction, opposite the first direction, so that the electrode discharge surfaces move within the plane.

20. The method of machining a part defined in claim 13 wherein the machining step includes machining the annular surface of the part by moving the electrode discharge surfaces within the plane simultaneously moving a first plurality the electrodes near the annular surface of the part to create sparks therebetween while moving a second plurality of electrodes near the annular surface of the part to prevent a spark therebetween, wherein both the first and second pluralities of electrodes include a plurality of electrode groups such that the electrode groups are electrically insulated from each other and the electrodes within each group are electrically connected to each other.

21. The method of machining a part defined in claim 20 wherein the electrode assembly is an electrode ring and the electrode discharge surfaces are circumferentially spaced apart around the ring such that each electrode discharge surface forms a separate sector of the electrode ring.

22. The method of machining a part defined in claim 21 further including rotating the electrode assembly so that the electrode discharge surfaces move within the plane.

23. The method of machining a part defined in claim 22 further including rotating the electrode assembly in a second direction, opposite the first direction.

24. A method of machining a brake rotor comprising:

providing a brake rotor having an axis of rotation and an annular friction section having a friction surface coaxially disposed about the axis of rotation;

providing an electrode assembly including a plurality of electrodes disposed in a circumferentially spaced apart relationship forming an electrode ring, the electrodes having discharge surfaces aligned in a plane and circumferentially spaced apart around the ring such that each electrode discharge surface forms a separate sector of the electrode ring;

rotating the electrode assembly so that the electrode discharge surfaces move within the plane;

rotating the rotor about the axis of rotation; and moving the electrode discharge surfaces and the rotor friction section sufficiently close to each other to form sparks therebetween to vaporize portions of the friction section.

25. The method of machining a brake rotor defined in claim 24 further including rotating the rotor in a first direction and rotating the electrode in a second direction, opposite from the first direction.

26. The method of machining a brake rotor defined in claim 24 wherein the electrode assembly includes first and second electrodes and further including providing first and second power supplies and connecting the first electrodes to the first power supply and connecting the second electrodes to the second power supply.

27. The method of machining a brake rotor defined in claim 24 wherein the electrodes include a plurality of electrode groups such that the electrode groups are electrically insulated from each other and the electrodes within each group are electrically connected to each other.

28. The method of machining a brake rotor defined in claim 27 further including providing a plurality of power supplies and connecting each electrode group to a different one of the plurality of power supplies.

29. A method of machining a brake rotor comprising:

providing a brake rotor having an axis of rotation, a friction section having an annular friction surface coaxially disposed about the axis of rotation, a hat wall and a groove disposed between the hat wall and the fiction surface;

providing an electrode assembly including a plurality of electrodes disposed in a circumferentially spaced apart relationship forming an electrode ring having a radially outer edge, the electrodes having discharge surfaces aligned in a plane and circumferentially spaced apart around the electrode ring; and machining the brake rotor by simultaneously rotating the rotor about the rotor axis of rotation, and rotating the electrode assembly so that the electrode discharge surfaces move within the plane and the radially outer edge of the electrode ring passes over the rotor groove to prevent sparks at the radially outer edge of the electrode ring.

30. The of machining a brake rotor defined in claim 29 further including rotating the brake rotor in a first direction and rotating the electrode assembly in a second direction, opposite the first direction.

31. The method of machining a brake rotor defined in claim 29 wherein the electrodes assembly includes first and second electrodes and further including connecting the first electrodes to a first power supply and connecting the second electrodes to a second power supply.

\* \* \* \* \*